United States Patent
Liu et al.

(10) Patent No.: US 8,891,971 B1
(45) Date of Patent: Nov. 18, 2014

(54) SIGNAL QUALITY IN BI-DIRECTIONAL OPTICAL LINKS USING OPTICAL CIRCULATORS

(71) Applicant: Google Inc., Mountain View, CA (US)

(72) Inventors: Hong Liu, Palo Alto, CA (US); Ryohei Urata, Sunnyvale, CA (US); Christopher L. Johnson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 90 days.

(21) Appl. No.: 13/630,709

(22) Filed: Sep. 28, 2012

Related U.S. Application Data

(60) Provisional application No. 61/662,253, filed on Jun. 20, 2012.

(51) Int. Cl.
*H04B 10/00* (2013.01)
(52) U.S. Cl.
USPC ............. 398/139; 398/138; 398/135; 398/45
(58) Field of Classification Search
CPC ........ H04B 10/40; H04B 10/43; H04B 10/11; H04B 10/1121; H04B 10/1141; H04B 10/1125; H04B 10/1143; H04B 10/1149; H04B 10/30; H04B 10/70; H04B 10/12; H04B 10/152; G02B 6/4246; G02B 6/4292; G02B 6/4214; G02B 6/2861; H04J 14/08; H04Q 11/0003; H04Q 11/0005; H04Q 11/0062; H04Q 11/0066; H04Q 11/0001; H04Q 2011/0039; H04Q 2011/0015; H04Q 2011/0016; H04Q 2011/0024; H04Q 2011/0052

USPC .......... 398/45, 50, 51, 54, 56, 135, 138, 130, 398/139, 128
See application file for complete search history.

(56) References Cited

U.S. PATENT DOCUMENTS

| | | | | |
|---|---|---|---|---|
| 5,943,151 | A * | 8/1999 | Grasso et al. | 398/147 |
| 7,298,974 | B2 * | 11/2007 | Tanobe et al. | 398/63 |
| 2004/0120713 | A1 * | 6/2004 | Ward et al. | 398/45 |

OTHER PUBLICATIONS

S. Das and E.E. Harstead, "Beat interference penalty in optical duplex transmission," IEEE J. Lightwave Technol., vol. 20, No. 2, pp. 213-217, Feb. 2002.

* cited by examiner

*Primary Examiner* — M. R. Sedighian
(74) *Attorney, Agent, or Firm* — Foley & Lardner LLP; Edward A. Gordon

(57) ABSTRACT

Implementations of an apparatus including an optical circuit switch (OCS) having a plurality of OCS input/output ports, at least one optical circulator having a port optically coupled to a corresponding one of the plurality of OCS input/output ports and a reflection mitigation positioned in the optical path between each optical circulator port and its corresponding OCS input/output port and/or in the optical path inside the OCS. A corresponding optical transceiver is optically coupled to each of the at least one optical circulators. Each optical transceiver includes a transmitter optically coupled to one port of the optical circulator and a receiver optically coupled to another port of the optical circulator.

13 Claims, 5 Drawing Sheets

SIGNAL QUALITY IN BI-DIRECTIONAL OPTICAL LINKS USING OPTICAL CIRCULATORS

CROSS-REFERENCE TO RELATED APPLICATIONS

This application claims priority under the provisions of 35 U.S.C. §119(e) to U.S. Provisional Application No. 61/662,253, filed 20 Jun. 2012.

TECHNICAL FIELD

The described implementations relate generally to optical communication links and in particular, but not exclusively, to improved signal quality in bi-directional optical links using optical circulators.

BACKGROUND

Cloud computing and its applications are changing the way people communicate and share information. The underlying computer networks that support cloud computing and other services can consist of an enormous number of individual computers—thousands to tens of thousands of them—housed in large facilities and working in concert. These large facilities are referred to as warehouse-scale computers. As a result of their size, warehouse-scale computers require the interconnection of large numbers of computers and networking devices (e.g., servers, switches and routers). The sheer number and scale of interconnection in warehouse-scale computers creates a need for low-cost interconnects with low power consumption, compact size, and good signal quality.

BRIEF DESCRIPTION OF THE DRAWINGS

Non-limiting and non-exhaustive implementations of the present invention are described with reference to the following figures, wherein like reference numerals refer to like parts throughout the various views unless otherwise specified.

DETAILED DESCRIPTION OF THE ILLUSTRATED IMPLEMENTATIONS

Implementations of an apparatus, system and method are described for improved signal quality in bi-directional optical links using optical circulators. Numerous specific details are described to provide a thorough understanding of implementations of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one implementation" or "an implementation" means that a particular feature, structure, or characteristic described in connection with the implementation is included in at least one described implementation. Thus, appearances of the phrases "in one implementation" or "in an implementation" in this specification do not necessarily all refer to the same implementation. Furthermore, the particular features, structures, or characteristics may be combined in any suitable manner in one or more implementations.

Figure 1:
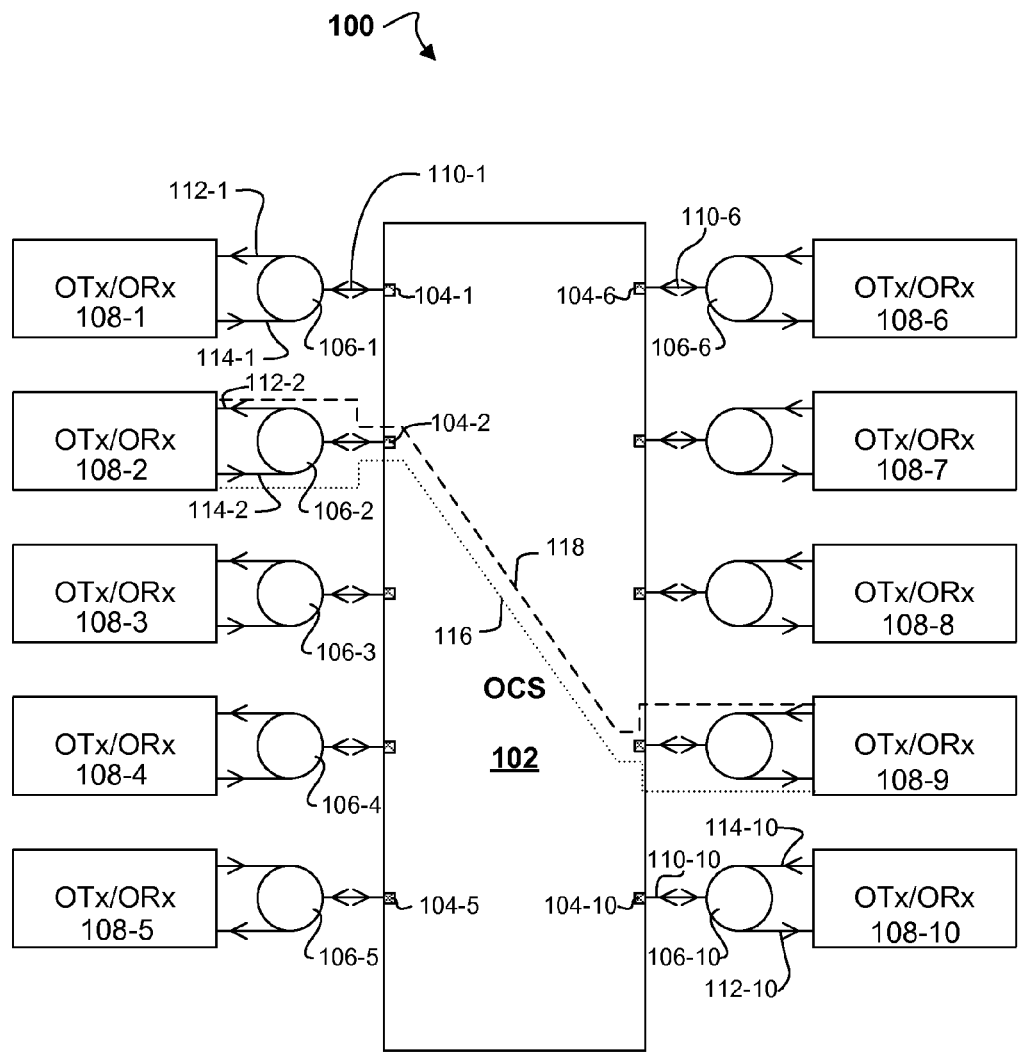
FIG. 1 is a block diagram of an implementation of an optical communication system.

FIG. 1 illustrates an implementation of an optical communication system 100. System 100 includes an optical communication switch (OCS) 102 having a plurality of input/output ports 104. A plurality of optical circulators 106 are each coupled to a corresponding input/output port 104, and each optical circulator 106 is also optically coupled to a corresponding optical transceiver 108. The illustrated implementation shows ten optical circulators 106-1 through 106-10 and ten corresponding optical transceivers 108-1 through 108-10, such that there is an optical circulator and an optical transceiver coupled to every one of the input/output ports 104-1 through 104-10. In other implementations, the full capacity of OCS 102 need not be used—that is, not every input/output port 104 of the OCS 102 need be coupled to a circulator and transceiver, although there will generally be at least one pair of these components (i.e., two circulators and two corresponding transceivers) coupled to input/output ports 104 so that the OCS 102 can route signals from one member of the pair to the other.

In the illustrated implementation, each optical circulator 106 is optically coupled to its corresponding input/output port 104 by an optical link 110. Similarly, each optical transceiver 108 is coupled to its corresponding optical circulator 106 by a pair of optical links 112 and 114. In one implementation, optical links 110, 112 and 114 can be optical waveguides such as single-mode optical fiber, multi-mode optical fiber or silicon waveguides. In still other implementations, these optical links can be of other types, such as free-space optical connections. In the illustrated implementation optical links 110, 112 and 114 are all of the same type, but in other implementations, these optical links need not all be of the same type.

In the illustrated implementation, each optical circulator 106 is connected to its corresponding input/output port 104 by a single optical link 110 such that communication through optical link 110 is bi-directional, meaning that two different optical signals travel in opposite directions through the optical link. Optical communication between each optical circulator 106 and its corresponding optical transceiver 108 occurs through links 112 and 114 such that the optical communication through each of these links is unidirectional, meaning that optical signals travel in only one direction through each of these links.

Optical circuit switch (OCS) 102 is essentially a programmable optical patch panel, with N input/output ports 104. In the illustrated implementation, OCS 102 has 10 input/output ports 104-1 through 104-10, but in other implementations OCS 102 could have any number of input/output ports. As its name implies, OCS 102 is a switch that can optically couple any input/output port 104 to any other input/output port 104; this is known as bijective mapping of the ports. In one implementation, OCS 102 can be implemented through a mechanical switching mechanism, directing light beams between different ports 104 in free space or through direct fiber attach. One example is micro-electro-mechanical systems (MEMS) based technology with 2-D arrays of silicon mirrors which are tilted by applying a control signal (e.g., a voltage signal) to deflect optical beams in free space to different fiber ports. In another implementation, piezoelectric actuator technology can be used to directly steer optical beams in free space between different ports. In still other implementations, OCS's that use electro-optical or thermo-optical mechanisms can be used. With the OCS's ability to be programmed through software, optical interconnections are thus made and managed easily, facilitating planning, deployment, and upgrading/changes of an optical communication network.

Optical circulators 106 are used with OCS 102 to double the total system switch port count (N×N to 2N×2N), and halve the number of fiber cables per switch port to reduce fiber loading. Optical circulators 106 allow bidirectional communication over a single OCS path, effectively creating an input/output port at each original port of the OCS. This effectively doubles the number of bidirectional communication links through the original OCS (2N×2N). In addition, when circulator 106 is placed next to the optical transceiver 108, the amount of fiber directly connected to OCS 102 per bidirectional port and communication link is halved. As the optical transceiver and corresponding communication port may be placed away from the OCS, halving the number of potentially long fiber connections to the OCS allows significant reduction in cost and volume of the underlying fiber infrastructure. Details of an implementation of an optical circulator are discussed below in connection with FIG. 4.

Each optical transceiver 108 includes an optical transmitter coupled to optical circulator 106 via link 114 as well as an optical receiver coupled to optical circulator 106 via link 112. As their names imply, each optical transmitter transmits an optical data signal, while each optical receiver receives an optical data signal and converts it into an electrical data signal. Details of implementations of an optical receiver and an optical transmitter that together can form an optical transceiver 108 are discussed below in connection with FIGS. 2-3.

In operation of system 100, an optical data signal 116 originating at transceiver 108-2 is injected into port A of optical circulator 106-2, whose port B is connected to a corresponding input/output port 104 and whose port C is connected to the receiver within transceiver 108-2. Optical data signal 116 travels through the OCS, to its destination input/output port 104, where port B of optical circulator 106-9 is connected. The optical data signal then finally exits through optical circulator 106-9 at port C and it carried to transceiver 108-9. For the opposite communication direction, optical data signal 118 is injected into port A of optical circulator 106-9, which directs signal 118 to the input/output port 104. Signal 118 travels through OCS 102 along the same path as signal 116 but in the reverse direction to input/output port 104-2, where circulator 106-2 outputs optical signal 118 through its port C to transceiver 108-2.

Figures 2, 3:
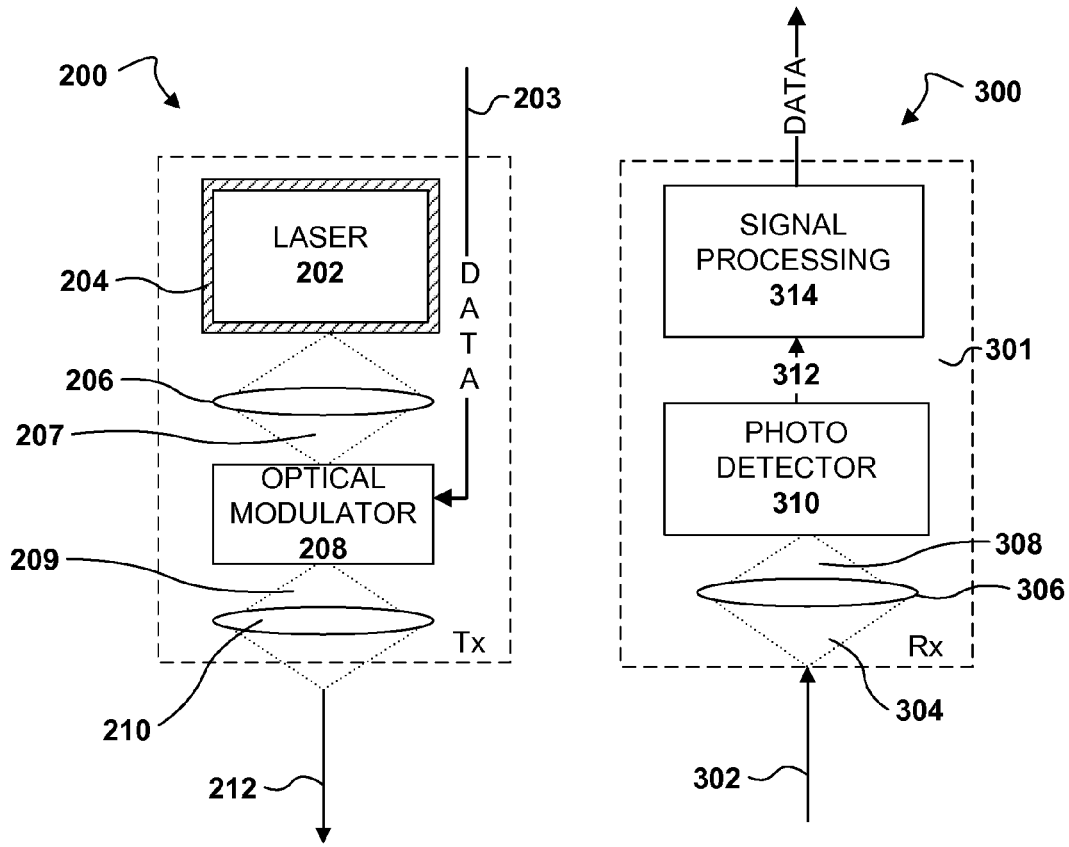
FIG. 2 is a block diagram of an implementation of an optical transmitter.
FIG. 3 is a block diagram of an implementation of an optical receiver.

FIG. 2 illustrates an implementation of an optical transmitter 200. Coupling optics 206, which can include refractive, reflective and/or diffractive elements, are positioned at the output of a laser 202 to form a focused carrier signal 207. An optical modulator 208 is positioned in the optical path of carrier signal 207, and optics 210 are positioned in the optical path of the output of optical modulator 208 to launch the output of the optical modulator into a link 212. Other implementations of a transmitter can include other elements that are not shown, such as beamsplitter/combiner, wavelength locker, laser or modulator driver, monitor photodetector, control circuits and so on.

Laser 202 can be any kind of laser that outputs an optical beam at the desired carrier wavelength and within required power and efficiency constraints. Implementations of laser 202 can output wavelength ranging from about 600 nm to about 1800 nm, but in other implementations wavelengths outside this range are possible. In implementations of transmitter 200 that will be used together with fairly dense wavelength spacing (coarse WDM is defined as about 20 nm wavelength spacing; wavelength spacing less than this, for example 1 nm or less in one implementation, can be considered "denser" WDM), a laser that outputs with narrow spectral width and at an accurately defined wavelength, is desirable when high spectral efficiency is needed. In one implementation, laser 202 can be a Fabry-Perot laser, but in other implementations it can be another type of laser, such as a continuous wave (CW) laser, a DBR laser, DFB laser, a short-cavity DFB laser, a tunable laser, a multi-line laser coupled with a filtering element, or a quantum dot (QD) laser.

In some implementations, the output wavelength of laser 202 can be temperature dependent, which can lead to wavelength drift during operation. In implementations where the output wavelength of laser 202 needs to be controlled, a temperature control unit 204 can be coupled to the laser to stabilize the output wavelength. Temperature control unit 204 can be an active element, such as a thermo-electric cooler (TEC), or can be a passive element such as a heat sink or heater to transfer heat from or to the laser. A temperature control unit 204 could also be shared among some or all devices inside one implementation (i.e., other lasers, photodetectors, modulators, circuits, multiplexers, demultiplexers, etc.).

Optical modulator 208 is positioned in the path of the carrier signal 207 and is also coupled to a data source 203. In one implementation data source 203 can be a communication port of a server, but in other implementations data source 203 can be the communication port of another kind of device, such as an electrical router or switch. In other implementations data source 203 can include interface devices connected to a communication port.

Optical modulator 208 performs an electro-optic conversion of the signal received from data source 203 by modulating the data onto the carrier signal 207 from laser 202. The output of optical modulator 208 is thus an optical data signal 209. The optical modulator 208 can be implemented in various configurations, such as an electro-optic Mach-Zehnder modulator (MZM) or an electro-absorption modulator (EAM). In the illustrated implementation optical modulator 208 is an external modulator, but in other implementations, laser 202 can be modulated directly by the data 203 in the form of a driving current feeding into the laser, and produces a modulated optical data signal.

Optics 210 are positioned in the optical path of optical data signal 209 to launch the optical data signal or signals from multiple input data channels, into a link 212, which in one implementation can be a single-mode optical fiber. The particular nature of optics 210 will depend on such factors as the size of the optical data signal 209 and the size of the core of link 212. For example, if the optical data signal 209 spreads out at a particular angle, optics 210 must be large enough to capture the signal, as well as focus the signal into the core of link 212. In certain implementations, optics 210 can include refractive, reflective and/or diffractive optics.

FIG. 3 illustrates an implementation of an optical receiver 300. Receiver 300 includes an input link 302 optically coupled to optics 306. Optics 306 is in turn optically coupled to photodetector 310, and photodetector 310 is electrically connected to signal processing circuitry 314. In one implementation link 302 can be a single-mode optical fiber, but in other implementations other types of links can be used.

Optics 306 are positioned in the optical path of received optical data signal 304 and serve to condition optical signal 304, for example by focusing it, and to direct it toward photodetector 310. The particular nature of optics 306 will depend on such factors as the spread angle of optical data signal 304 when it leaves the end of link 302 and the size of photodetector 310. In some implementations, optics 306 can include one or more of refractive, reflective and diffractive optics. In some implementations optics 306 can be unnecessary, such that received optical data signal 304 can go directly from link 302 to photodetector 310.

Photodetector 310 receives optical data signal 308, performs an optoelectronic conversion, and outputs an electrical data signal 312. Photodetector 310 can be any kind of photodetector that has sufficient sensitivity at the carrier wavelength of received optical data signal 308. Here, sufficient sensitivity implies a photodetector sensitivity high enough such that the resulting electrical data signal 312 is large enough and can be detected cleanly, with high integrity and little or no errors. In one implementation photodetector 310 can be a p-n or p-i-n photodiode, but in other implementations other types of photodiodes, such as avalanche photodiodes (APD), Schottky photodiodes, and phototransistors, can be used.

Signal processing circuitry 314 receives electrical data signal 312, extracts the data from the data signal, and transmits that data to a communication port of a device such as a server, a switch or a router. The data can also be transmitted to interface devices, which in turn connect to a communication port. Signal processing circuitry 314 can also provide additional signal conditioning functions, such as signal amplification, filtering, etc.

Although FIGS. 2-3 illustrate the transmitter and receiver as separate entities, in other implementations the various wavelength transmitters and receivers and their component parts can be grouped/integrated into a single system. For the transmitter side, all the lasers or a sub-set of the lasers can be integrated into a single semiconductor substrate. Likewise, if modulators were used, the lasers and modulators could be integrated, and additionally, the various laser-modulator pairs could be integrated into arrays. For the receiver side, all the photodetectors or a sub-set of the photodetectors can be integrated into a single semiconductor substrate. Finally, the lasers, modulators, photodetectors, etc., could all be integrated, or sub-sets integrated, in the form of a monolithic or hybrid photonic integrated circuit (PIC). In addition, the above photonic devices can be integrated with the electronic circuits, in the form of a monolithic or hybrid optoelectronic integrated circuit (OEIC). In the above cases, it is possible that the multiple optical outputs from an array of transmitters/lasers each are designed to have a different wavelength. These various wavelength signals are then combined or multiplexed into a WDM signal. The wavelength signals would then share the same optical path through the optical circulator and OCS. Another WDM signal in the opposite direction with the same or different wavelengths could also share the same optical path, analogous to the implementation in FIG. 1, for a single wavelength signal. Each WDM signal would be received initially by a demultiplexer which then separates out the various wavelengths into a receiver for each wavelength. Within this WDM link scheme, the transmitters and receivers may be individual or integrated.

Figure 4:
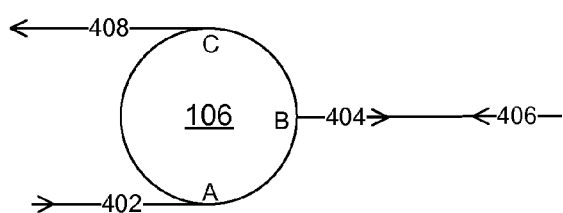
FIG. 4 is a block diagram of an implementation of an optical circulator.

FIG. 4 illustrates an implementation of optical circulator 106. Optical circulator 106 is a three-port device which has a cyclic connectivity, such that input into port A is directed to port B, and input into port B is directed to port C. In the illustrated implementation, an input signal 402 enters optical circulator 106 at port A and exits as output signal 404 through port B. Simultaneously, an input signal 406 enters optical circulator 106 at port B and exits the optical circulator at port C as output signal 408. The optical circulator's functionality can be achieved through a combination of polarizers and magneto-optical materials (most commonly Garnett). Optical circulators are a standard commercially-available fiber optic component.

Figure 5:
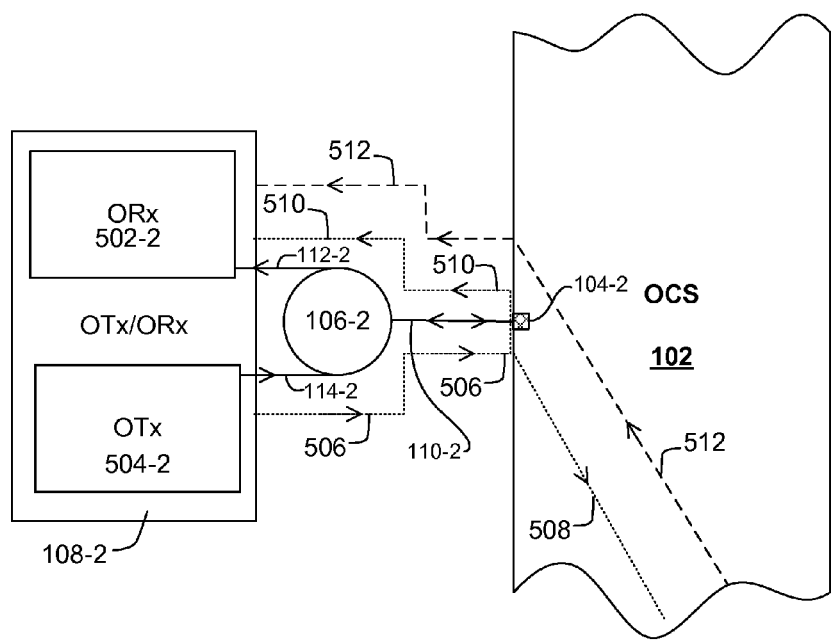
FIG. 5 is a block diagram of a portion of the implementation of an optical communication system shown in FIG. 4 illustrating the effect of reflections in an optical path.

FIG. 5 illustrates the operation of optical circulator 106-2 and optical transceiver 108-2 within optical communication system 100. Optical transceiver 108-2 includes an optical transmitter 504-2 an optical receiver 502-2. In operation, optical transmitter 504-2 transmits an optical data signal 506 through optical link 114-2 to optical circulator 106-2. Optical data signal 506 can have a single carrier wavelength or can be an optical WDM signal with multiple carrier wavelengths. Optical circulator 106-2 directs optical data signal 506 into link 110-2, which carries optical data signal 506 to input/output port 104-2. Upon reaching input/output port 104-2, a portion 508 of the original signal 506 is transmitted into OCS 102 and is routed by OCS 102 to its intended destination. Another portion 510 of original optical data signal 506 is reflected at some point in the optical path, either within link 110-2, at input/output port 104-2, within the optical path inside the OCS, at the OCS input/output port to which optical signal 508 is directed, or within the link between that OCS input/output port and its corresponding optical circulator. Reflected signal 510 is directed back down optical link 110-2 in the reverse direction, through optical circulator 106-2, and into optical link 112-2. Optical link 112-2 then carries reflected signal 510 to optical receiver 502-2. At the same time, OCS 102 can direct an optical signal 512 originating from a separate transceiver to optical receiver 502-2 through input/output port 104-2, into link 110-2, around optical circulator 106-2 and into optical link 112-2.

The reflection of transmitted optical signal 506 in the optical path causes optical receiver 502-2 to simultaneously receive both a true optical signal 512 that originates from another signal source and has optical receiver 502-2 as its intended destination, as well as a noise optical signal 510 that originates from the receiver's own paired transmitter 504-2 but has some other optical receiver as its intended destination. The noise optical signal 510 could also result from multiple reflections within the path, which results in a time delayed version of the desired signal adding/interfering on top of the desired signal. The simultaneous reception of both true signal 512 and noise signal 510 can cause distortion of the true signal at optical receiver 502-2, degrading the integrity of the signal. In a bidirectional link, because the direction of the light—and nothing else, such as wavelength, polarization, etc.—determines the link, the noise signal 510 cannot be distinguished, and hence filtered out, from the true signal 512.

Figure 6:
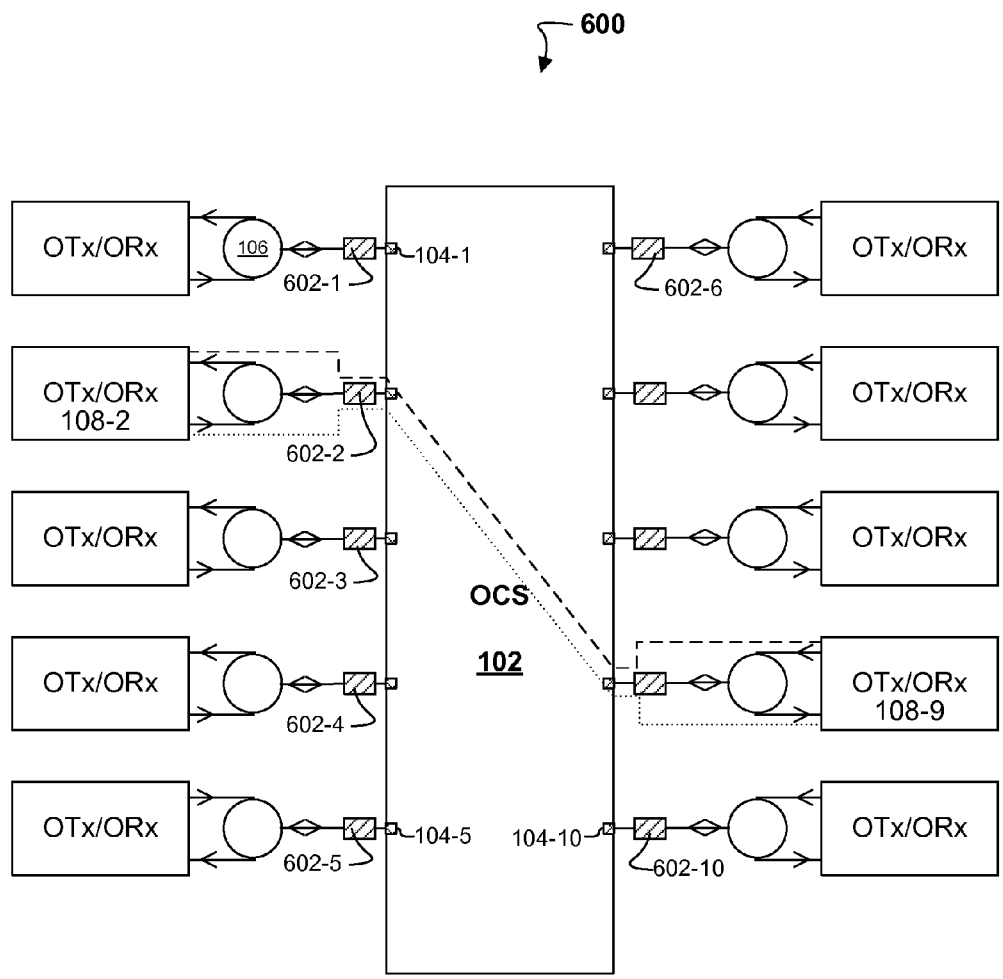
FIG. 6 is a block diagram of an implementation of an optical communication system including provisions for reducing or eliminating reflections in the optical paths.

FIG. 6 illustrates an implementation of an optical communication system 600 that reduces or eliminates reflection in the optical paths. Communication system 600 is in most respects similar to system 100 shown in FIG. 1. The primary difference between systems 600 and 100 is the presence in system 600 of reflection mitigation 602 in the optical path between optical circulators 204 and OCS 202, and the optical path within the OCS. Hence, communication system 600 is configured to reduce or eliminate reflections in the optical paths between optical circulators. In the illustrated implementation, reflection mitigation techniques 602 are implemented in the optical coupling between each optical circulator 204 and its corresponding input/output port 104, Still other implementations can include reflection mitigation techniques in addition to or instead of those illustrated in the figure, for example within the optical path inside the OCS.

In one implementation, reflection mitigation can be achieved with low return loss (low reflection) connectors, for example ultra physical contact (UPC) connectors or angled physical contact (APC) connectors. In yet other implementations, connectors can also be entirely eliminated by fusion splicing together appropriate circulator and OCS fibers. The optical path within the OCS 102 itself can also be designed to have low reflections or return loss, by optimizing the interface between fiber optic components and free space components or any other interfaces within the path (e.g., the correct dielectric coating technology, index matching material, and avoiding quarter wavelength resonance effect).

Figure 7:
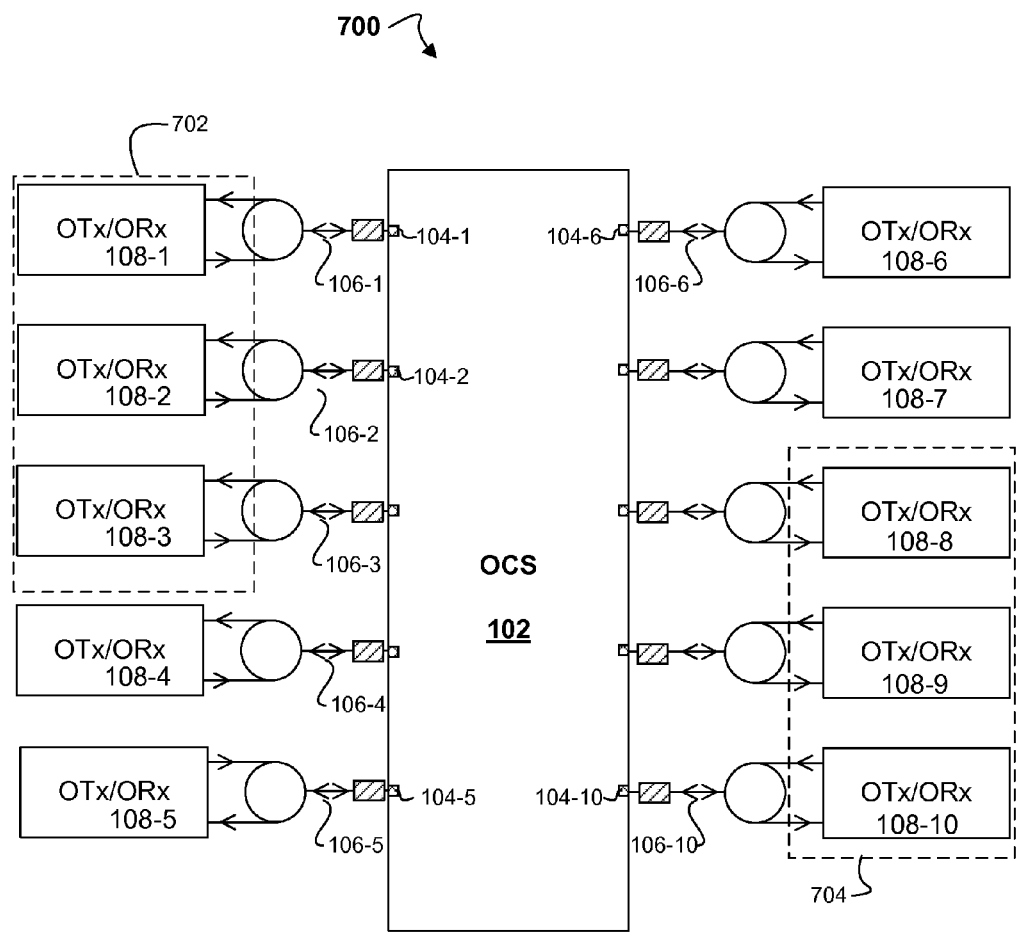
FIG. 7 is a block diagram of an alternative implementation of an optical indication system including provisions for reducing or eliminating reflections in the optical paths.

FIG. 7 illustrates an alternative implementation of an optical communication system 700. Communication system 700 is in most respects similar to communication systems 100 or 600; although the illustrated implementation of system 700 includes the reflection mitigation techniques of system 600, the implementations described below apply equally well to system 100, which does not include reflection mitigation. The primary difference between system 700 and systems 100 and 600 is that in system 700 the operational characteristics of optical transceivers 108 are adjusted to eliminate, substantially reduce, or compensate for the effects of noise signal 510 (see FIG. 5).

Implementations of system 700 can use a coarse WDM (CWDM) wavelength plan (where the wavelength can be across a very wide range of 13 nm) as opposed to a dense WDM (DWDM) wavelength plan in which the wavelength(s) is narrowly defined (must be within a range of ~0.1 nm), to reduce the effect of beat frequency on signal quality. If in an optical connection between a pair of transceivers the transceiver on one end has the same or close to the same frequency/wavelength as the transceiver on the other end, the difference frequency will be less than or equal to the data rate of the desired signal, which will be low enough to be seen by the receiver. In short, the true signal and noise signal will interfere with each other and this will cause a beat/difference signal, resulting in a noise term which is dependent not only on the relatively small power of the noise signal 510, but is amplified by the larger power of the true signal 512. This can result in severe degradation of the signal quality, resulting in a power penalty which is essentially a requirement for more power into the receiver for a desired signal integrity (bit error rate) or, even worse, a limit on the signal integrity (a bit error rate floor). The likelihood of increasing the beat signal frequency (and reducing the signal degrading effect) can thus be achieved by allowing for a wide range/distribution of the transceiver wavelength(s) to increase the probability of the true and reflected wavelength signal being further apart.

In another implementation of system 700, the strength of the beat signal can be weakened by utilizing lasers with a broader spectrum (i.e., the wavelength of the laser is less well defined). A directly modulated laser (DML) versus an externally modulated laser (EML), is an example, where the DML has shorter coherence length (i.e., broader spectrum) than the EML, making its use advantageous in this situation.

In another implementation of system 700, the dynamic range of the laser diode output power of each transceiver can be limited through selection of appropriate laser chips and/or limiting the temperature variation of the optical transceiver environment. The worst case signal-to-noise ratio (SNR) of the received signal occurs when true signal 512 is weak and noise signal 510 is strong (see FIG. 5). Variation of transmitted optical signal strength for different optical transceivers is caused by fabrication variations in the laser diode serving as the optical light source, as well as variation in the output power of the laser as a function of its temperature, which is a function of its surrounding temperature. One downside of the selecting appropriate laser chips is a likely increase in cost due to reduced yield of the laser chips which are fabricated and can be used.

In implementations of system 700 where the dynamic range of the laser diode output power of each transceiver can be limited through selection of appropriate laser chips, the laser chip yield issue can be circumvented by matching lasers, and their corresponding transceivers, according to their output power. Weaker lasers would be matched with weaker lasers on a particular bidirectional link, stronger lasers with stronger lasers. In one implementation, this laser power-matching can be done in individual pairs of transceivers, but in other implementations the powers of entire groups of transceivers, such as groups 702 and 704, can be matched, for example if it is know that transceivers in these two groups will often communicate with each other. In yet another implementation, in addition to power matching pairs or groups of transceivers, the difference in wavelength(s) between pairs or groups of transceivers can be maximized to push the beat signal frequency out of the receiver's sensitivity window.

The above description of illustrated implementations of the invention, including what is described in the abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. An apparatus comprising:
   an optical circuit switch (OCS) having a plurality of OCS input/output ports;
   at least one pair of optical circulators, each optical circulator having a port optically coupled to a corresponding one of the plurality of OCS input/output ports; and
   at least one pair of optical transceivers, each optical transceiver optically coupled to a corresponding optical circulator, and each optical transceiver including a transmitter coupled to one port of the optical circulator and a receiver optically coupled to another port of the optical circulators;
   wherein the optical transceivers in each of the at least one pair of optical transceivers are configured to compensate for reflections that can occur in the optical path between each optical circulator and its corresponding OCS input/output port.

2. The apparatus of claim 1 wherein configuring the optical transceivers to compensate for reflections comprises matching the power output of the transmitters in each pair of transceivers.

3. The apparatus of claim 2 wherein matching the power output of the transmitters in each pair comprises matching the dynamic range of the transmitters in each pair of transceivers.

4. The apparatus of claim 1 wherein configuring the optical transceivers to compensate for reflections comprises, within each transceiver, providing a large wavelength spacing between the wavelength transmitted by the transmitter and the wavelength received by the receiver.

5. The apparatus of claim 4 wherein providing a large wavelength spacing comprises employing a coarse wavelength-division multiplexing (CWDM) scheme.

6. The apparatus of claim 4 wherein providing a large wavelength spacing comprises selecting wavelengths in a dense wavelength-division multiplexing (DWDM) scheme to maximize the wavelength spacing between the wavelength transmitted by the transmitter and the wavelength received by the receiver.

7. The apparatus of claim 4 wherein providing a large wavelength spacing comprises maximizing the wavelength spacing between the wavelength transmitted by the transmitter and the wavelength received by the receiver.

8. The apparatus of claim 1, further comprising a reflection mitigation coupled between each optical circulator port and its corresponding OCS input/output port.

9. The apparatus of claim 8 wherein the reflection mitigation comprises a low return loss connector.

10. The apparatus of claim 8 wherein the reflection mitigation comprises a low-reflection connector.

11. The apparatus of claim 8 wherein the reflection mitigation comprises an index-matched optical material within an optical path that optically couples the at least one optical circulator to its corresponding OCS input/output port or within an optical path inside the OCS.

12. An apparatus comprising:
an optical circuit switch (OCS) having a plurality of OCS input/output ports;
at least one optical circulator having a port optically coupled to a corresponding one of the plurality of OCS input/output ports;
a first reflection mitigation positioned in the optical path between each optical circulator and its corresponding OCS input/output port wherein the first reflection mitigation includes an index-matched optical material within the optical path that optically couples the optical circulator to its corresponding OCS input/output port;
a second reflection mitigation positioned between the OCS input and output ports, inside the OCS wherein the second reflection mitigation includes an index-matched optical material within an optical path inside the OCS; and
a corresponding optical transceiver optically coupled to each of the at least one optical circulators, each optical transceiver including a transmitter optically coupled to one port of the optical circulator and a receiver optically coupled to another port of the optical circulator.

13. An apparatus comprising:
an optical circuit switch (OCS) having a plurality of OCS input/output ports;
at least one optical circulator having a port optically coupled to a corresponding one of the plurality of OCS input/output ports wherein the at least one optical circulator includes at least one pair of optical circulators, each coupled to a corresponding optical transceiver, wherein the optical transceivers in each of the at least one pair of optical transceivers are configured to compensate for reflections that can occur in the optical path between each optical circulator;
a first reflection mitigation positioned in the optical path between each optical circulator port and its corresponding OCS input/output port;
a second reflection mitigation positioned in the optical path between OCS input and output ports, inside the OCS; and
a corresponding optical transceiver optically coupled to each of the at least one optical circulators, each optical transceiver including a transmitter optically coupled to one port of the optical circulator and a receiver optically coupled to another port of the optical circulator.

* * * * *